United States Patent [19]

Malka et al.

[11] Patent Number: 4,879,642

[45] Date of Patent: * Nov. 7, 1989

[54] SERVO LOOP PROCESSOR IN ASSOCIATION WITH A CENTRAL PROCESSING UNIT FOR CLOSED LOOP CONTROL OF A SERVO SYSTEM

[75] Inventors: Jacob H. Malka, Fair Lawn; Glenn J. Ahern, Wood-Ridge, both of N.J.

[73] Assignee: Allied-Signal Inc., Morris Township, Morris County, N.J.

[ * ] Notice: The portion of the term of this patent subsequent to Feb. 7, 2004 has been disclaimed.

[21] Appl. No.: 662,321

[22] Filed: Oct. 18, 1984

[51] Int. Cl.[4] .................. G05B 19/29; G06F 15/46
[52] U.S. Cl. .................. 364/131; 364/167.01; 364/174; 364/138; 318/562; 318/569; 318/615; 318/626
[58] Field of Search ................ 364/131-133, 364/135, 138, 139, 167, 172, 174; 318/562, 567, 569, 600, 626, 615, 618

[56] References Cited

U.S. PATENT DOCUMENTS

| | | | |
|---|---|---|---|
| 3,626,385 | 12/1971 | Bouman | 318/562 |
| 3,701,888 | 10/1972 | McDaniel | 318/562 |
| 3,777,128 | 12/1973 | Kirkham | 318/562 |
| 3,987,282 | 10/1976 | Lau et al. | 318/562 |
| 4,242,621 | 12/1980 | Spaulding | 364/167 |
| 4,277,731 | 7/1981 | Pongracz | 318/562 |
| 4,328,452 | 5/1982 | Rager et al. | 318/616 |
| 4,398,241 | 8/1983 | Baker et al. | 364/167 |
| 4,484,307 | 11/1984 | Quaste et al. | 364/900 |

Primary Examiner—John R. Lastova
Attorney, Agent, or Firm—Howard G. Massung

[57] ABSTRACT

A servo loop processor (2) is a dedicated controller for use with a main central processing unit (4) (CPU), through an appropriate interface (8,10) whereby closed loop control of a servo system (22) is achieved. Servo loop parameters as well as servo motor speed and/or position are downloaded from the main CPU (4) to the servo loop processor (2) through a configuration including a microcomputer (12) so that the main CPU (4) is free to perform other tasks.

13 Claims, 1 Drawing Sheet

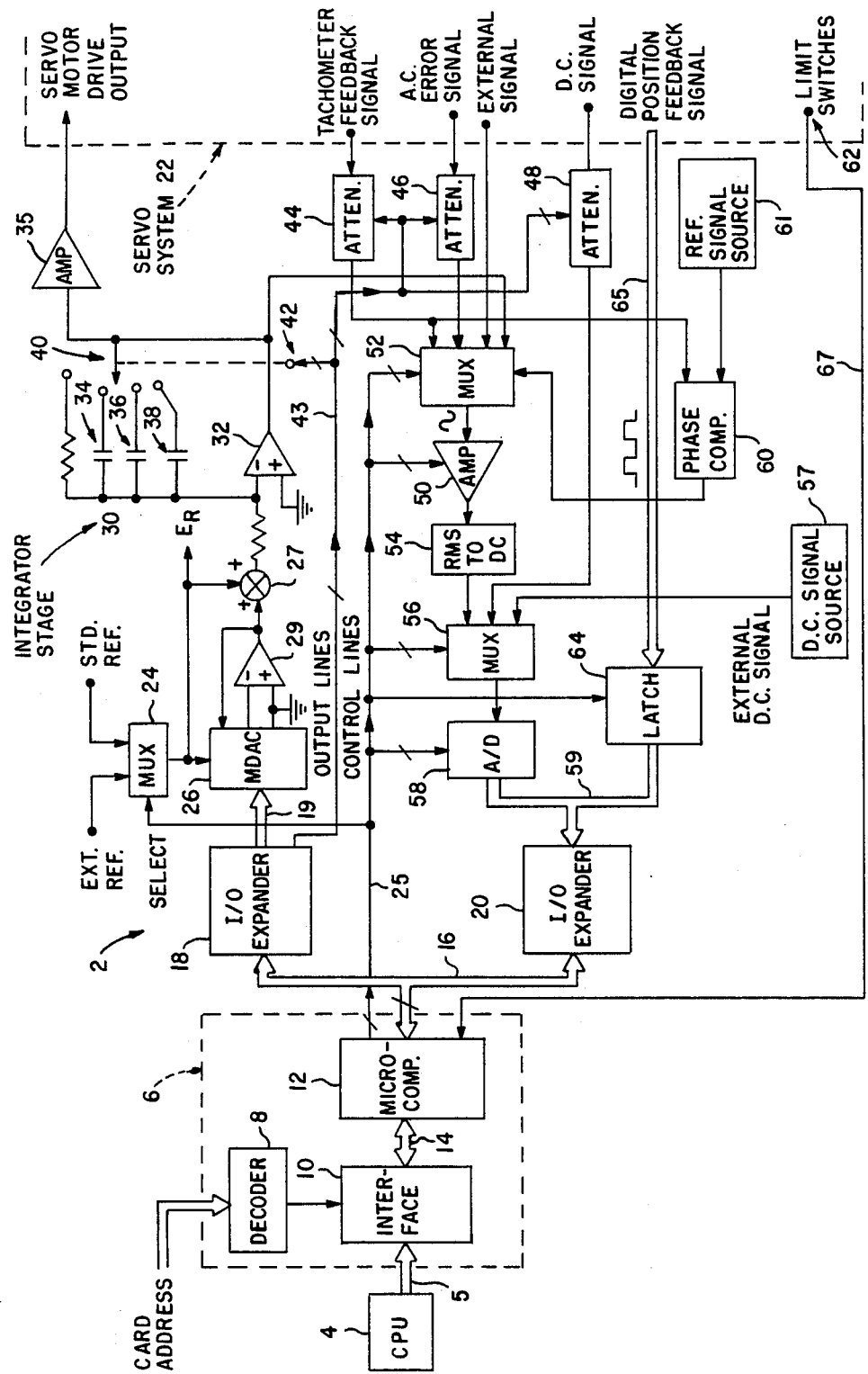

SERVO LOOP PROCESSOR IN ASSOCIATION WITH A CENTRAL PROCESSING UNIT FOR CLOSED LOOP CONTROL OF A SERVO SYSTEM

BACKGROUND OF THE INVENTION

Servo systems are utilized for various purposes including, for purposes of illustration, aircraft instrument control and antenna positioning and control. Closed loop control (feedback) of servo motor position and/or speed is a function common to all such systems. Servo system feedback parameters vary in form. For example, position feedback may be a D.C. signal, an A.C. error signal or a digital position signal from an encoder. Rate feedback may come from the servo system tachometer feedback signal, with the phase of the tachometer signal indicating direction of rotation of the servo motor. Limit switches are monitored to indicate an end-of-travel position.

Servo motor coefficients change and motor excitation frequencies vary. Some motors require a phase shift between the excitation voltage and a reference voltage.

The servo loop processor of the invention is used in association with a central processing unit (CPU) and appropriate input/output circuitry to achieve the aforenoted closed loop control. Servo loop parameters as well as servo motor speed and/or position are downloaded from the CPU to the servo loop processor. The downloaded information and servo loop feedback parameters are used for determining an appropriate output level and phase for driving the servo motor.

SUMMARY OF THE INVENTION

This invention contemplates a servo loop processor which is used in conjunction with a central processing unit (CPU) as a dedicated controller for a servo system. The arrangement is such that servo loop parameters may be changed with facility via an open-loop gain configuration. Open loop gain, transient response, settling time and offset error can be modified, as can servo motor and feedback coefficients. The servo loop processor and the CPU are arranged in a configuration whereby the CPU can be fully utilized. D.C., A.C. and digital feedback signals are accomodated. An external reference input is used, whereby a specific frequency and waveshape of the servo motor excitation voltage is applied to the servo loop processor while the amplitude of the excitation voltage is controlled by the CPU. A phase shift between the excitation voltage and the reference input for selected outputs at different frequencies is accomodated.

BRIEF DESCRIPTION OF THE DRAWING

The single FIG. in the drawing is a block diagramelectrical schematic of a servo loop processor according to the invention.

DETAILED DESCRIPTION OF THE INVENTION

With reference to the drawing, the servo loop processor of the invention is designated generally by the numeral 2 and communicates with a main central processing unit (CPU) 4 through an interface means 6. Interface means 6 includes a decoder 8, an interface 10 connected to CPU 4 via a bus 5 and a microcomputer 12 connected to interface 10 via a bus 14.

A selected card address is decoded by decoder 8 which enables interface 10. Interface 10 includes appropriate buffers and control logic. Direct communication between CPU 4 and microcomputer 12 is achieved via interface 10 and bus 14.

Microcomputer 12 interfaces with input and output circuitry through a bus 16 and a pair of input/output (I/O) expanders 18 and 20. An output voltage for driving a motor (not shown) in a servo system designated generally by the numeral 22 is provided by selecting an appropriate reference channel through a multiplexer (MUX) 24 controlled by a select signal from control lines 25 connected to bus 16. The amplitude of the output signal is controlled digitally by a multiplying digital to analog converter (MDAC) 26 which is driven by the output of I/O expander 18 via a bus 19. The input to multiplexer 24 may be an external reference signal or a standard reference signal having a predetermined frequency. The output of multiplexer 24, which is a reference voltage designated as $E_R$, is applied to MDAC 26 and to a summing means 27, and added thereby to the output from MDAC 26 applied through an operational amplifier 29. The output of amplifier 29 is fed back to MDAC 26.

The output from summing means 27 is applied to an integrator stage 30 including an operational amplifier 32 and a plurality of capacitors shown as three in number and designed by the numerals 34, 36 and 38. Capacitors 34, 36 and 38 are arranged in parallel and are connected in feedback configuration to amplifier 32 through a switch 40. Switch 40 is selectively operable to connect one of the capacitors 34, 36 and 38 in the feedback loop. Switch 40 is actuated by analog switch means 42 driven by I/O expander 18 via expander output lines 43.

With the arrangement shown, a phase shift is provided by selecting a particular capacitor 34, 36 and 38 in integrator stage 30 through switch 40. The capacitor values are such that a 90 degree phase shift is achieved for preselected reference frequencies such as, for purposes of illustration, 400 Hz, 800 Hz and 1,125 Hz, respectively. The output signal at the output of integrator stage 30 is applied to an amplifier 35 which provides an output for driving the servo motor in servo system 22.

Feedback from servo system 22 can assume various forms to accomodate a wide dynamic signal range. Signal attenuation is available via attenuators 44, 46 and 48 and signal gain is available via an amplifier 50. Thus, attenuator 44 may receive a speed and direction feedback signal from the servo system tachometer (not shown). Attenuator 46 receives an A.C. error signal and attenuator 48 receives a D.C. signal, said A.C. and D.C. signals being provided by feedback means in servo system 22 and otherwise not shown.

Microcomputer 12 decides whether a particular channel in the servo system needs attenuation, direct feedthrough or amplification before signal measurement. To this end, attenuators 44, 46 and 48 are connected to I/O expander 18 through expander output lines 43, and amplifier 50 is connected to control lines 25 leading from bus 16.

An analog multiplexer (MUX) 52 is connected to integrator amplifier 32 and control lines 25, and receives input signals from attenuator 44, attenuator 46 and integrator amplifier 32. MUX 52 also receives an external signal from servo system 22. MUX 52 chooses which of the input signals thereto will be applied to amplifier 50, which provides an RMS output, and therefrom to an RMS to D.C. converter 54.

A multiplexer (MUX) 56 receives the D.C. signal from RMS to D.C. converter 54, the D.C. signal from attenuator 48 and an external D.C. signal from a signal source 57. MUX 56 is controlled through control lines 25 for selecting which of the D.C. input signals thereto will be applied to an analog to digital converter 58 connected to I/O expander 20 through a bus 59.

To determine the direction of servo motor rotation, a feedback signal provided by a servo system tachometer (not shown) is applied through attenuator 44 to a phase comparator 60 and compared thereby with the phase of a reference signal from a reference signal source 61. An in-phase condition is thereby detected by phase comparator 60 providing a square wave output which is routed to RMS to D.C. converter 54 through MUX 52 and amplifier 50.

A digital position feedback signal is provided by servo system feedback means (not shown) or from limit switches 62 in the servo system. The feedback signal is applied to a latch 64 via a bus 65 whereby it can be accessed by microcomputer 12 via bus 59, I/O expander 20 and bus 16. The limit switches are directly connected to microcomputer 12 via a line 67.

There has thus been described a servo loop processor which is used in conjunction with a central processing unit (CPU) as a dedicated controller for a servo system. Open loop gain, transient response, settling time and offset error can be modified via the central processing unit. In the arrangement shown and described, the servo loop processor allows the flexibility of microcomputer 12 to be fully utilized. All types of feedback including digital, D.C. and A.C. feedback are accomodated. An external reference input permits a specific frequency and waveshape of the servo motor drive output to be dictated to the circuit, while the amplitude is controlled by the microprocessor. Further, a phase shift of 90 degrees, common to some servo systems, may be selected for sinusoidal inputs at predetermined frequencies. Since the servo loop processor is intended to be a dedicated controller for use with a main central processing unit, the main CPU can download dependant parameters as well as desired position and speed data to the servo loop processor and is thereby free to perform other tasks.

It will be understood that the elements of the invention herein described and shown in the drawing are commercially marketed elements readily available as circuit cards or chips. The novelty of the invention therefore resides in the combination of these elements and not in the elements themselves.

With the aforegoing description of the invention in mind, reference is had to the appended claims for a definition of the scope of the invention.

What is claimed is:

1. A servo loop processor in association with a central processing unit for closed loop control of a servo system, characterized by:
   interface means connected to the central processing unit;
   the interface means including information processing means in communication with the central processing unit, whereby servo loop parameters and servo system motor characteristics are downloaded from the central processing unit to the information processing means, said information processing means providing control signals;
   first means connected to the information processing means and responsive to control signals therefrom for providing a signal for driving the servo system motor, said first means including a first multiplexer receiving a plurality of reference signals and connected to the information processing means and controlled by a control signal therefrom for selecting one of the reference signals and for providing a reference signal corresponding to the selected signal, means connected to the first multiplexer and receiving the corresponding reference signal, and connected to the information processing means and controlled by a control signal therefrom for controlling the amplitude of the corresponding reference signal and for providing an amplitude controlled signal, means for combining the corresponding reference signal and the amplitude controlled signal and for providing a combined signal, integrator means connected to the combining means for integrating the combined signal, and means connected to the integrator means and responsive to the integrated combined signal for providing a signal for driving the servo system motor; and
   second means connected to the information processing means, the first means and the servo system, and responsive to a control signal from the information processing means and the signal from the first means for selectively applying feedback signals from the servo system to the information processing means.

2. A servo loop processor as described by claim 1, further characterized by:
   feedback means connected to the means for providing an amplitude controlled signal.

3. A servo loop processor as described by claim 1, wherein the integrator means is characterized by:
   an operational amplifier connected to the combining means;
   feedback means connected to the operational amplifier, said feedback means including a plurality of capacitors connected in parallel relation to the input of the operational amplifier, and normally open switching means connected to the output of the operational amplifier and to the plurality of capacitors; and
   means connected to the information processing means and to the normally open switching means and controlled by a control signal from the information processing means for closing said switching means to selectively connect one of the plurality of capacitors in feedback relation to the operational amplifier, whereby a selected waveshape and frequency is applied to the integrated combined signal.

4. A servo loop processor as described by claim 3, wherein the integrator means is characterized by:
   an operational amplifier connected to the combining means; and
   feedback means connected to the operational amplifier and operable whereby a selected waveshape and frequency is applied to the integrated combined signal.

5. A servo loop processor as described by claim 4, wherein the feedback means is characterized by:
   capacitor means connected to the input of the operational amplifier, and normally open switching means connected to the output of the capacitor means; and means connected to the information processing means and to the normally open switching means and controlled by a control signal from said information processing means for closing said switching means.

6. A servo loop processor as described by claim 5, wherein the capacitor means is characterized by:
   a plurality of capacitors connected in parallel relation to the input of the operational amplifier; and
   the means connected to the information processing means and to the normally open switching means and controlled by a control signal from said information processing means for closing said switching means is controlled to selectively connect one of the plurality of capacitors in feedback relation to the operational amplifier.

7. A servo loop processor as described by claim 1, further characterized by:
   the means for combining the corresponding reference signal and the amplitude controlled signal adds said signals.

8. A servo loop processor as described by claim 1, wherein the second means is characterized by:
   first attenuator means connected to the servo system and to the information processing means and controlled by a control signal from said information processing means for attenuating a plurality of feedback signals from the servo system and for providing a corresponding plurality of attenuated signals;
   amplifier means connected to the information processing means;
   second multiplexer means connected to the first attenuator means, the integrator of the first means, the amplifier means and the information processing means, and receiving the plurality of attenuated signals and the integrated combined signal, and controlled by a control signal from the information processing means for selecting which of the received signals will be applied to the amplifier means;
   the amplifier means being controlled by a control signal from the information processing means for amplifying the signals applied thereto;
   second attenuator means connected to the servo system for attenuating other feedback signals therefrom; and
   third multiplexer means connected to the amplifier means and to the second attenuator means for receiving the signals from the amplifier means and the second attenuator means, and connected to the information processing means and controlled by a control signal therefrom for selecting which of the received signals will be applied to the information processing means.

9. A servo loop processor as described by claim 8, further characterized by:
   the plurality of feedback signals including a servo system motor speed and direction signal and an A.C. error signal; and
   the other feedback signal is a D.C. signal.

10. A servo loop processor as described by claim 8, further characterized by:
    the first attenuator means attenuates a feedback signal from the servo system corresponding to the direction of rotation of the servo system motor;
    a phase comparator connected to said first attenuator means and to a reference signal source for comparing the phases of the signals therefrom and for providing a signal having a predetermined waveform when an in-phase condition exists between the compared signals, said signal being indicative of the direction of rotation of the servo motor; and
    the second multiplexer means connected to the phase comparator and receiving the signal therefrom.

11. A servo loop processor as described by claim 1, further characterized by;
    means connected to the servo system and to the information processing means, and receiving a position feedback signal from the servo system and controlled by a control signal from the information processing means for applying the position feedback signal to the information processing means.

12. A servo loop processor as described by claim 1, further characterized by:
    means connected to the servo system for providing a signal corresponding to the end-of-travel of the servo motor; and
    said means connected to the interface means and applying the end-of-travel signal to the information processing means included therein.

13. A servo loop processor as described by claim 1, characterized by:
    the first multiplexer receiving one reference signal of an external reference signal and a reference signal having a predetermined frequency.

* * * * *